(12) United States Patent
Moos et al.

(10) Patent No.: US 8,190,369 B2
(45) Date of Patent: May 29, 2012

(54) SYSTEM AND METHOD FOR STRESS FIELD BASED WELLBORE STEERING

(75) Inventors: Daniel Moos, Palo Alto, CA (US);
Gamal A. Hassan, Houston, TX (US);
Daniel T. Georgi, Houston, TX (US);
David A. Castillo, Trigg (AU); John Fabian, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/185,676

(22) Filed: Aug. 4, 2008

(65) Prior Publication Data
US 2009/0065252 A1    Mar. 12, 2009

Related U.S. Application Data

(63) Continuation-in-part of application No. 11/863,052, filed on Sep. 27, 2007, now Pat. No. 7,548,817.

(60) Provisional application No. 60/847,948, filed on Sep. 28, 2006, provisional application No. 60/849,962, filed on Oct. 6, 2006, provisional application No. 60/963,701, filed on Aug. 6, 2007.

(51) Int. Cl.
*G01V 1/40* (2006.01)

(52) U.S. Cl. .......................................................... 702/9

(58) Field of Classification Search ................ 702/9, 6, 702/11, 14, 39, 42; 73/152.01, 152.02, 152.03, 73/784, 152.58; 175/40, 50; 367/81, 86, 367/87, 25
See application file for complete search history.

(56) References Cited

U.S. PATENT DOCUMENTS

| | | | |
|---|---|---|---|
| 4,781,062 A | | 11/1988 | Taylor |
| 4,899,320 A | * | 2/1990 | Hearn et al. .................. 367/35 |
| 5,181,421 A | | 1/1993 | Kline |
| 5,899,958 A | * | 5/1999 | Dowell et al. .................. 702/6 |
| 6,084,826 A | * | 7/2000 | Leggett, III .................. 367/82 |
| 6,098,021 A | * | 8/2000 | Tang et al. .................. 702/14 |
| 6,226,595 B1 | * | 5/2001 | Rossi et al. .................. 702/10 |
| 6,705,415 B1 | | 3/2004 | Falvey et al. |
| 7,054,750 B2 | | 5/2006 | Rodney et al. |
| 7,104,320 B2 | * | 9/2006 | Buchanan et al. ............ 166/245 |
| 7,181,380 B2 | | 2/2007 | Dusterhoft et al. |
| 7,287,604 B2 | | 10/2007 | Aronstam et al. |
| 7,317,991 B2 | | 1/2008 | Wang et al. |
| 7,359,800 B2 | | 4/2008 | Rabinovich et al. |
| 2003/0075361 A1 | * | 4/2003 | Terry et al. .................. 175/61 |
| 2004/0001388 A1 | * | 1/2004 | Kriegshauser et al. ........ 367/21 |
| 2005/0115741 A1 | * | 6/2005 | Terry et al. .................. 175/61 |
| 2005/0150689 A1 | * | 7/2005 | Jogi et al. .................. 175/45 |
| 2005/0173639 A1 | | 8/2005 | Frederick et al. |
| 2007/0118292 A1 | | 5/2007 | Moos |
| 2007/0140055 A1 | * | 6/2007 | Tello et al. .................. 367/25 |
| 2007/0205022 A1 | * | 9/2007 | Treviranus et al. ............ 175/61 |

(Continued)

*Primary Examiner* — Cindy Hien-Dieu Khuu
(74) *Attorney, Agent, or Firm* — Cantor Colburn LLP

(57) ABSTRACT

A system and method for the geomechanical steering of the orientation of a wellbore is disclosed. In one embodiment, any available a priori data regarding the stress characteristics of a region of interest are used to develop a preliminary stress model for the region. A geosteered drilling operation is thereafter commenced, with the trajectory being steered in a direction relative to the stress model of the region. While drilling, real-time data is obtained from conventional down-hole instrumentation. The real-time data is used to refine the stress model for the region, such that the trajectory can be guided on an ongoing basis to achieve an optimal relationship with the measured stress characteristics of the region.

19 Claims, 12 Drawing Sheets

U.S. PATENT DOCUMENTS

2008/0062814 A1* 3/2008 Prioul et al. .................... 367/31
2008/0165619 A1* 7/2008 Bachrach et al. ............... 367/38
2008/0319675 A1* 12/2008 Sayers ........................... 702/11
2010/0004866 A1* 1/2010 Rabinovich et al. ............. 702/7

* cited by examiner

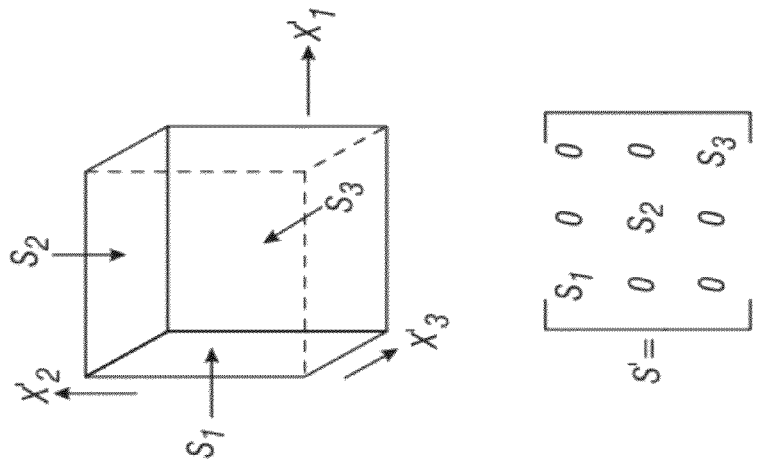
*Figure 1C (Prior Art)*
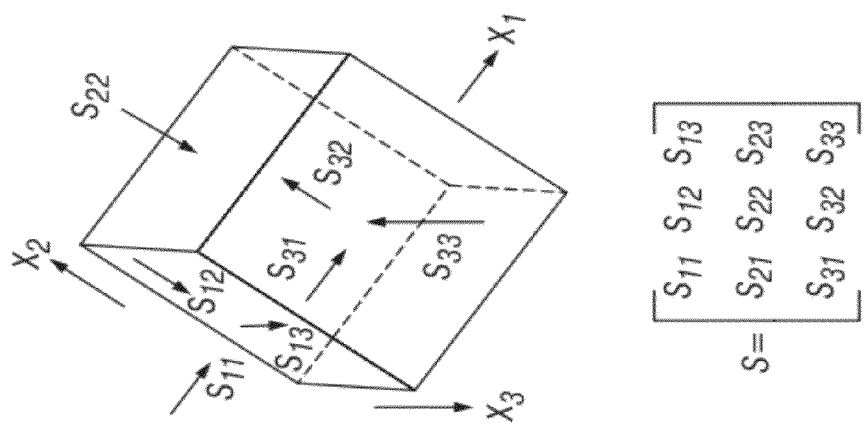
*Figure 1B (Prior Art)*
*Figure 1A (Prior Art)*

SYSTEM AND METHOD FOR STRESS FIELD BASED WELLBORE STEERING

CROSS-REFERENCES TO RELATED APPLICATIONS

This application claims priority from U.S. Provisional Patent Application Ser. No. 60/963,701 filed on 6 Aug. 2007, and is a continuation-in-part of U.S. patent application Ser. No. 11/863,052 of Hassan et al, filed on Sep. 27, 2007, now U.S. Pat. No. 7,548,817, which claimed priority from U.S. Provisional Patent Application Ser. No. 60/847,948 filed on Sep. 28, 2006 and from U.S. Provisional Patent Application Ser. No. 60/849,962 filed on Oct. 6, 2006.

FIELD OF THE DISCLOSURE

The present disclosure relates generally to hydrocarbon exploration and production, and more particularly relates to a method and system for guiding the trajectory of a wellbore.

BACKGROUND OF THE DISCLOSURE

In the early years of oil drilling and production, wells were primarily drilled on land, to moderate depths, and with relatively minor horizontal offsets. An empirical understanding of the impact of geological forces and earth material properties on required drilling and development practice was developed region by region. Successful practices were defined by trial and (sometimes costly and spectacular) error. It was only once local conditions were understood that it became possible to drill and complete new wells with a sufficient degree of confidence to guarantee the safety and economic success of further field developments. However, techniques that were successful in one field were not necessarily successful in other fields, and therefore the trial and error learning process often had to be repeated.

As wells have become more expensive and complex, both in terms of well geometry (reach and length) and access to deep, high temperature, high pore pressure, and high stress regimes, it has become clear that the economic success of field developments can only be assured if geology and tectonics are understood and field activities are designed with that understanding. Furthermore, constraints on engineering practice based on environmental and societal requirements necessitate specially designed mud formulations and drilling techniques. Development and application of these solutions depends critically not only on an understanding of the processes that act within the earth, but also of the impact of these processes on drilling and completion practice. The study of these processes, and of the interactions between them and their effect on earth materials, is called geomechanics.

Those of ordinary skill in the art will understand that forces in the earth are quantified by means of a stress tensor, in which the individual components are tractions (with dimensions of force per unit area) acting perpendicular or parallel to three planes that are in turn orthogonal to each other. The normals to the three orthogonal planes define a Cartesian coordinate system ($x_1$, $x_2$, $x_3$). FIGS. 1a, 1b, and 1c together illustrate (FIG. 1a) definitions of the stress tensor in Cartesian coordinates; (FIG. 1b) tensor transformation through direction cosines; and (FIG. 1c) the principal stress axes.

The stress tensor has nine components, each of which has an orientation and a magnitude, as shown in FIG. 1a. Three of these components are normal stresses, in which the force is applied perpendicular to the plane ($S_{11}$ is the stress component acting normal to a plane perpendicular to the $x_1$-axis); the other six are shear stresses, in which the force is applied along the plane in a particular direction (e.g., $S_{12}$ is the force acting in the $x_2$-direction along a plane perpendicular to the $x_1$-axis). In all cases, $S_{ij}=S_{ji}$, which reduces the number of independent stress components to six.

At each point there exists a particular stress axis orientation for which all shear stress components are zero, whose directions are referred to as the principal stress directions. The magnitudes of the three principal stresses acting in these directions are $S_1$, $S_2$, and $S_3$, corresponding to the greatest principal stress, the intermediate principal stress, and the least principal stress, respectively. Coordinate transformations between the principal stress tensor and any other arbitrarily oriented stress tensor are accomplished through tensor rotations. It has been found in most parts of the world that, at depths within reach of the drill bit, the stress acting vertically on a horizontal plane (defined as the vertical stress, $S_v$) is a principal stress. This requires that the other two principal stresses lie in a horizontal plane. Because these horizontal stresses almost always have different magnitudes, they are referred to as the greatest horizontal stress, $S_{Hmax}$ and the least horizontal stress, $S_{Hmin}$.

There are a number of different sources of stress in the Earth. Plate tectonic driving forces have constant orientations over wide areas. They are caused by a variety of effects, including ridge push from mid-ocean ridges, slab pull where plates are being subducted, collision resistance forces at converging plate margins such as in Trinidad or the Himalayas, forces along transform faults where plates are moving laterally past each other such as the San Andreas fault in California, and suction above subduction zones such as the NE of Australia.

Another source of stresses in the Earth is referred to as topographic loads, which can be due to large mountain chains such as the Canadian Rockies or the Himalayas, or from addition or removal of loads due to ice sheets or changes in sea level. In this category are gravitational loads such as those associated with sedimentation within basins, and down-slope extensional loads within active depositional sequences.

Lithostatic buoyancy constitutes another category of stress in the Earth because the lithosphere is lower in density than the underlying asthenosphere, it "floats" on the underlying material, and sediment loading and lateral changes in lithospheric thickness or density cause bending forces to develop. Flexural forces, still another category of stress, are generated due to localized topographic loads and to the forces acting on down-going slabs in subduction zones. Finally, earthquakes (slip on faults), active volcanism, and salt diapirism are all examples of processes that act to change local stresses.

Of each of the foregoing categories of stress, the processes that contribute to the in situ stress field primarily include plate tectonic driving forces and gravitational loading. Plate tectonic driving forces cause the motions of the lithospheric plates that form the crust of the earth. Gravitational loading forces include topographic loads and loads due to lateral density contrasts and lithospheric buoyancy. These are modified by the locally acting effects of processes such as volcanism, earthquakes (fault slip), and salt diapirism. Human activities, such as mining and fluid extraction or injection, can also cause local stress changes.

Because the largest components of the stress field (gravitational loading and plate driving stresses) act over large areas, stress orientations and magnitudes in the crust are remarkably uniform. However, local perturbations, both natural and man-made, are important to consider for application of geomechanical analyses to drilling and reservoir engineering. There are countless real-world examples of regions wherein the individual stress orientations within fields in the region are quite uniform, the stress varies systematically among the individual fields. It is also well known to those of ordinary skill in the art that stresses can be different within different geological layers, or within different fault blocks within the earth, and that adjacent to local sources of stress perturbation the stresses can change with position on a foot-by-foot basis.

Vertical stress can be the greatest, the intermediate, or the least principal stress. A classification scheme has been used to describe these three possibilities based on the type of faulting that would occur in each case. Table 1 sets forth definitions of the greatest principal stress ($S_1$) and the least principal stress ($S_3$) for different fault classifications.

TABLE 1

| FAULT REGIME | $S_1$ | $S_3$ |
| --- | --- | --- |
| Normal | $S_V$ | $S_{Hmin}$ |
| Strike-slip | $S_{Hmax}$ | $S_{Hmin}$ |
| Reverse | $S_{Hmax}$ | $S_V$ |

A normal faulting regime is one in which the vertical stress is the greatest stress. When the vertical stress is the intermediate stress, a strike-slip regime is indicated. If the vertical stress is the least stress, the regime is defined to be reverse. The horizontal stresses at a given depth will be smallest in a normal faulting regime, larger in a strike-slip regime, and greatest in a reverse faulting regime. In general, vertical wells are found to be progressively less stable as the regime changes from normal to strike-slip to reverse, and consequently require higher mud weights to drill.

Those of ordinary skill in the art will appreciate the desirability in many instances of drilling wellbores in particular orientations relative to the in situ stresses present along the wellbore trajectory. In particular, positioning a well in a specific orientation with respect to the in situ stress field or in a specific geological horizon selected on the basis of the state of stress can significantly improve or degrade the performance of the completed well. In the latter case, it is well known that placing a well within a geological horizon with a lower stress can improve the efficiency of hydraulic fracturing as well as its effectiveness for production or injection. This is in part because when the stress magnitude is smaller it requires a lower pressure to induce a fracture by fluid injection, and also in part because when the stress magnitude is smaller it is easier to maintain the desired fracture aperture and flow properties over the life of the well.

It is also well known that the orientation of a well with respect to the stresses can also improve or degrade the efficiency with which a well can be completed using other techniques such as by means of first casing and then perforating the casing in the well to connect the well to the fluid-bearing formation. The orientation of the well with respect to the stresses can also affect the cost of the installed hardware necessary to achieve well objectives. Such objectives are discussed in further detail in U.S. Pat. No. 7,181,380 to Dusterhoft et al., having the same assignee as the present disclosure and the contents of which are incorporated herein by reference. As disclosed in Dusterhoft, obtained information regarding pore pressure depletion, stress magnitudes and orientations, and strength of rock formation from hydrocarbon recovery modeling is used to determine optimum well completion design including the selection of a completion type, trajectory, and location. Additionally, the process may also consider probable failure mechanisms and identified completion requirements, and their corresponding effect on completion options One example of the benefit of optimally orienting a well trajectory with respect to the in situ stress field is in the case of a naturally fractured reservoir, where the flow properties of the natural fractures (which may have random or multiple orientations) depend on their orientation with respect to the principal stresses. In many cases the most permeable fractures in the earth are the subset of fractures that are optimally oriented for slip under the current stress field. In any case, the orientations of the natural fractures most likely to be permeable (the optimally oriented fractures) can be determined if the stress orientations and magnitudes are known. Because wells drilled perpendicular to the optimally oriented fractures will intersect the greatest number of these fractures and thus will have the highest likelihood of maximizing fluid flow connectivity to those fractures, it is possible simply by knowing the magnitudes and orientations of the stresses to select the best well orientation to maximize fluid flow between the well and the natural fractures in the earth.

In many cases, maximizing productivity or injectivity requires maximizing connections to natural fractures. In other cases, it is preferred to minimize connections to permeable fractures. Wells that achieve this latter objective have orientations that can also be computed using known techniques, but only if the stress magnitudes and orientations are known. Since stresses vary locally, it is advantageous in either case to have a method to determine the stresses and their orientations while the well is being drilled and to have the ability to change the well orientation if the stresses change. Knowing the stresses and their orientations then allows identifying in the current well on a foot-by-foot basis the degree of connection of the well to naturally permeable fractures, which in turn allows in either case selection of the best locations for perforations in cased and perforated wells.

Another example of the benefit of optimally orienting a well is in the case of a well that is to be completed by stimulation using hydraulic fracturing. Hydraulic fractures are known to propagate in most earth materials in directions such that they are perpendicular to the least principal stress. Therefore, wells that are drilled parallel to the least principal stress ($S_{Hmin}$), when stimulated using hydraulic fracturing, will have fractures that are perpendicular to the well axis. In a cased and perforated well, selectively perforating at discrete intervals and selectively stimulating each interval separately will result in a series of parallel fractures extending radially away from the well. This is optimal in certain circumstances to efficiently achieve maximum production from a field (or, in the case of so-called disposal wells, to achieve maximum injectivity for fluid disposal). In other cases, it is desirable to drill a well such that a single fracture is created by hydraulically stimulating the well that lies along the well axis. In this case, it is desirable to drill the well parallel to the intermediate or to the greatest principal stress. Wells drilled in orientations that deviate only a small amount from these optimal orientations will be much more difficult to stimulate, and will have geometries of the induced fractures that are significantly different from the desired geometries. Because stresses can vary locally, it is desirable to know on a localized basis (e.g., foot-by-foot) the local orientation of the stress field, so that fracture stimulations can be selectively carried out only where the well has the best orientation with respect to the local in situ stress field to achieve the desired result.

Although these and other advantages to optimally orienting wellbores relative to stress fields are known to persons of ordinary skill in the art, there remains an unmet demand for improvement in the manner by which wellbores can be so optimally oriented.

SUMMARY OF THE DISCLOSURE

One embodiment of the disclosure is a method of evaluating an earth formation. The method includes conveying a bottomhole assembly (BHA) into a borehole; making measurements indicative of a stress in the formation during rotation of the BHA; using the measurements indicative of the stress in the formation for estimating an azimuthal variation of the stress in the formation; and altering a drilling parameter of the BHA using the estimated azimuthal variation of the stress in the formation.

Another embodiment of the disclosure is a system for evaluating an earth formation. The system includes a bottomhole assembly (BHA) configured to be conveyed into a borehole; a sensor assembly on the BHA configured to make measurements indicative of a stress in the formation during rotation of the BHA; and at least one processor configured to use the measurements indicative of the stress in the formation to estimate an azimuthal variation of the stress in the formation, and alter a drilling parameter of the BHA using the estimated azimuthal variation of the stress in the formation.

Another embodiment of the disclosure is a computer-readable medium accessible to a processor, the computer-readable medium including instructions which enable the processor to: use measurements indicative of a stress in the formation to estimate an azimuthal variation of stress in the formation; and alter a drilling parameter of a bottomhole assembly (BHA) using the estimated azimuthal variation of the stress in the formation.

BRIEF DESCRIPTION OF THE DRAWINGS

The foregoing and other features and aspects of the present disclosure will be best appreciated by reference to a detailed description of the specific embodiments of the disclosure, when read in conjunction with the accompanying drawings, wherein:

FIG. 1a schematically illustrates a stress tensor S in an arbitrary Cartesian coordinate system;

FIG. 1b depicts a tensor transformation corresponding to rotation of the axes of the system in FIG. 1a;

FIG. 1c schematically illustrates a principal stress tensor S' in Cartesian coordinates, including the greatest principal stress $S_1$, the intermediate principal stress $S_2$, and the least principal stress $S_3$;

DETAILED DESCRIPTION OF A SPECIFIC EMBODIMENT OF THE DISCLOSURE

Figure 2:
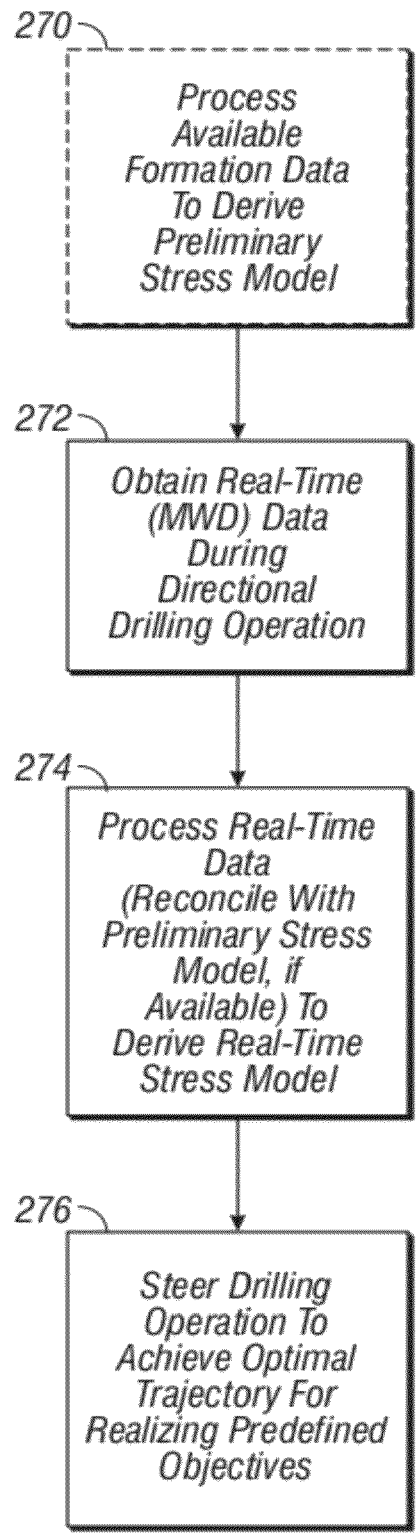
FIG. 2 is a flow diagram illustrating a preferred methodology for practicing the present disclosure.

Referring to FIG. 2, there is shown a flow diagram illustrating geomechanical wellbore steering in accordance with one embodiment of the disclosure. As shown in FIG. 2, formation data for a region into which a borehole is to be drilled may be obtained and processed 270, to derive a preliminary stress model for the region. In an alternate embodiment of the disclosure, information about the stress field may be obtained during drilling operations as discussed below.

In some cases, prior drilling activity in the region may have occurred such that certain a priori data may be available from which the stress field in the region may be modeled, at least preliminarily. Alternatively, or in addition, one or more offset or pilot boreholes may be drilled in the region to obtain either by measuring while drilling (MWD) and/or by post-drilling measurements using selected instruments, of which there are examples too numerous to itemize herein, providing data from which stress conditions within the region may be derived.

In many cases, such a pilot well may comprise a simple vertical borehole. Drilling pilot or offset wells prior to directional drilling is often carried out in the industry, although as noted above it is not essential to the advantageous and beneficial practice of the present disclosure.

With continued reference to FIG. 2, a drilling operation is commenced. Details of the drilling system are discussed further below. Information about the stress field may be obtained using measurement-while-drilling (MWD) techniques. The real-time MWD data are processed to derive a real-time stress model 274. The drilling system is then controlled to achieve a desired trajectory for achieving predefined objectives. Details of a drilling system are discussed next.

Figure 3:
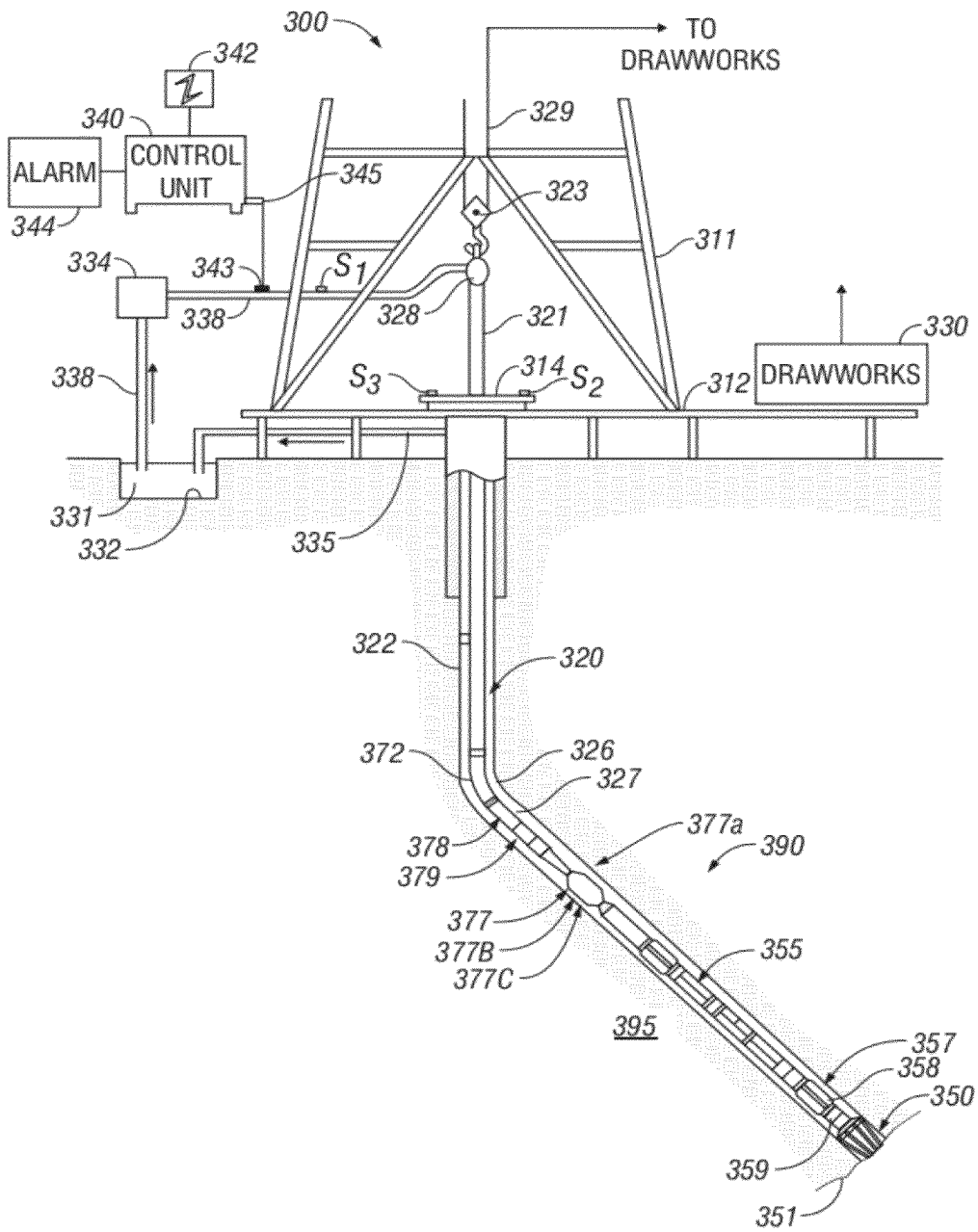
FIG. 3 schematically illustrates a drilling system suitable for use with the present disclosure.
Figure 4:
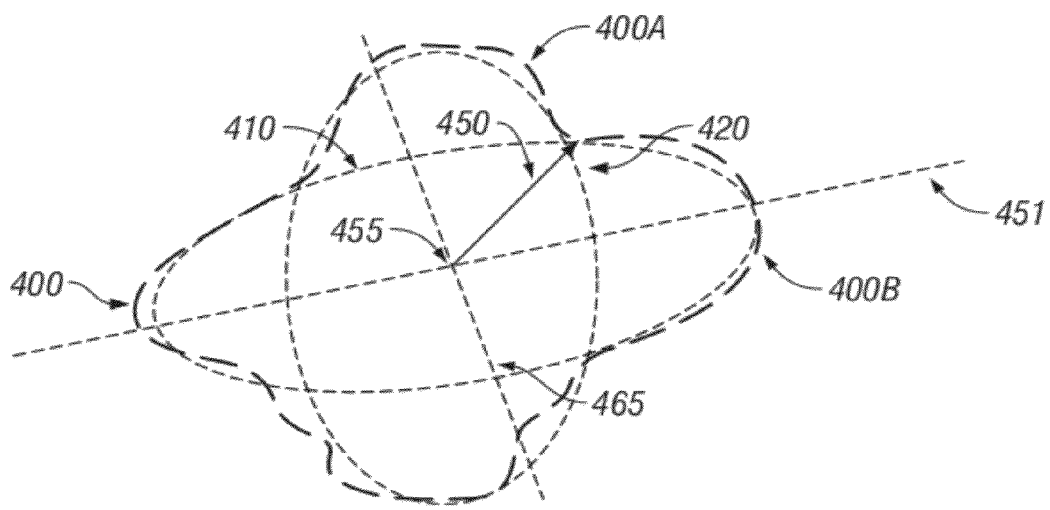
FIG. 4 shows the principle of fitting an ellipse to data points.

Referring next to FIG. 3, a schematic diagram is shown of a drilling system 300 useful in various illustrative embodiments, the drilling system 300 having a drillstring 320 carrying a drilling assembly 390 (also referred to as a bottomhole assembly, or "BHA") conveyed in a "wellbore" or "borehole" 326 for drilling the wellbore 326 into geological formations 395. The drilling system 300 may include a conventional derrick 311 erected on a floor 312 that may support a rotary table 314 that may be rotated by a prime mover such as an electric motor (not shown) at a desired rotational speed. The drillstring 320 may include tubing such as a drill pipe 322 or a coiled-tubing extending downward from the surface into the borehole 326. The drillstring 320 may be pushed into the wellbore 326 when the drill pipe 322 is used as the tubing. For coiled-tubing applications, a tubing injector (not shown), however, may be used to move the coiled-tubing from a source thereof, such as a reel (not shown), to the wellbore 326. A drill bit 350 may be attached to the end of the drillstring 320, the drill bit 350 breaking up the geological formations 395 when the drill bit 350 is rotated to drill the borehole 326. If the drill pipe 322 is used, the drillstring 320 may be coupled to a drawworks 330 via a Kelly joint 321, a swivel 328, and a line 329 through a pulley 323. During drilling operations, the drawworks 330 may be operated to control the weight on the drill bit 350 or the "weight on bit," which is an important parameter that affects the rate of penetration (ROP) into the geological formations 395. The operation of the drawworks 330 is well known in the art and is thus not described in detail herein.

During drilling operations, in various illustrative embodiments, a suitable drilling fluid 331 (also known and/or referred to sometimes as "mud" or "drilling mud") from a mud pit (source) 332 may be circulated under pressure through a channel in the drillstring 320 by a mud pump 334. The drilling fluid 331 may pass from the mud pump 334 into the drillstring 320 via a desurger (not shown), a fluid line 338, and the Kelly joint 321. The drilling fluid 331 may be discharged downhole at a borehole bottom 351 through an opening (not shown) in the drill bit 350. The drilling fluid 331 may circulate uphole through an annular space 327 between the drillstring 320 and the borehole 326 and may return to the mud pit 332 via a return line 335. The drilling fluid 331 may act to lubricate the drill bit 350 and/or to carry borehole 326 cuttings and/or chips away from the drill bit 350. A flow rate and/or a mud 331 dynamic pressure sensor $S_1$ may typically be placed in the fluid line 338 and may provide information about the drilling fluid 331 flow rate and/or dynamic pressure, respectively. A surface torque sensor $S_2$ and a surface rotational speed sensor $S_3$ associated with the drillstring 320 may provide information about the torque and the rotational speed of the drillstring 320, respectively. Additionally, and/or alternatively, at least one sensor (not shown) may be associated with the line 329 and may be used to provide the hook load of the drillstring 320.

The drill bit 350 may be rotated by only rotating the drill pipe 322. In various other illustrative embodiments, a downhole motor 355 (mud motor) may be disposed in the bottomhole assembly (BHA) 390 to rotate the drill bit 350 and the drill pipe 322 may be rotated usually to supplement the rotational power of the mud motor 355, if required, and/or to effect changes in the drilling direction. In various illustrative embodiments, electrical power may be provided by a power unit 378, which may include a battery sub and/or an electrical generator and/or alternator generating electrical power by using a mud turbine coupled with and/or driving the electrical generator and/or alternator. Measuring and/or monitoring the amount of electrical power output by a mud generator included in the power unit 378 may provide information about the drilling fluid (mud) 331 flow rate.

The mud motor 355 may be coupled to the drill bit 350 via a drive shaft (not shown) disposed in a bearing assembly 357. The mud motor 355 may rotate the drill bit 350 when the drilling fluid 331 passes through the mud motor 355 under pressure. The bearing assembly 357 may support the radial and/or the axial forces of the drill bit 350. A stabilizer 358 may be coupled to the bearing assembly 357 and may act as a centralizer for the lowermost portion of the mud motor 355 and/or the bottomhole assembly (BHA) 390.

A drilling sensor module 359 may be placed near the drill bit 350. The drilling sensor module 359 may contain sensors, circuitry, and/or processing software relating to dynamic drilling parameters. Such dynamic drilling parameters may typically include bit bounce of the drill bit 350, stick-slip of the bottomhole assembly (BHA) 390, backward rotation, torque, shocks, borehole and/or annulus pressure, acceleration measurements, and/or other measurements of the drill bit 350 condition. A suitable telemetry and/or communication sub 372 using, for example, two-way telemetry, may also be provided, as illustrated in the bottomhole assembly (BHA) 390. The drilling sensor module 359 may process the raw sensor information and/or may transmit the raw and/or the processed sensor information to a surface control and/or processor 340 via the telemetry system 372 and/or a transducer 343 coupled to the fluid line 338, as shown at 345, for example.

The communication sub 372, the power unit 378, and/or a formation evaluation (FE) tool 379, such as an appropriate measuring-while-drilling (MWD) tool, for example, may all be connected in tandem with the drillstring 320. Flex subs, for example, may be used in connecting the FE tool 379 in the bottomhole assembly (BHA) 390. Such subs and/or FE tools 379 may form the bottomhole assembly (BHA) 390 between the drillstring 320 and the drill bit 350. The bottomhole assembly (BHA) 390 may make various measurements, such as electrical measurements, pulsed nuclear magnetic resonance (NMR) measurements and/or nuclear density (ND) measurements, for example, while the borehole 326 is being drilled. In various illustrative embodiments, the bottomhole assembly (BHA) 390 may include one or more formation evaluation and/or other tools and/or sensors 377, such as one or more acoustic transducers and/or acoustic detectors and/or acoustic receivers 377a, capable of making measurements of the distance of a center of the downhole FE tool 379 from a plurality of positions on the surface of the borehole 326, over time during drilling, and/or one or more mechanical or acoustic caliper instruments 377b.

A mechanical caliper may include a plurality of radially spaced apart fingers, each of the plurality of the radially spaced apart fingers capable of making measurements of the distance of the center of the downhole FE tool 379 from a plurality of positions on the borehole wall 326, over time during drilling, for example. An acoustic caliper may include one or more acoustic transducers which transmit acoustic signals into the borehole fluid and measure the travel time for acoustic energy to return from the borehole wall. In one embodiment of the disclosure, the transducer produces a collimated acoustic beam, so that the received signal may represent scattered energy from the location on the borehole wall where the beam impinges. In this regard, the acoustic caliper measurements are similar to measurements made by a mechanical caliper. The discussion of the disclosure below is based on such a configuration.

In an alternate embodiment of the disclosure, the acoustic transducer may emit a beam with wide angular coverage. In such a case, the signal received by the transducer may be a signal resulting from specular reflection of the acoustic beam at the borehole wall. The method of analysis described below would need to be modified for such a caliper.

Still referring to FIG. 3, the communication sub 372 may obtain the signals and/or measurements and may transfer the signals, using two-way telemetry, for example, to be processed on the surface, either in the surface control and/or processor 340 and/or in another surface processor (not shown). Alternatively, and/or additionally, the signals may be processed downhole, using a downhole processor 377c in the bottomhole assembly (BHA) 390, for example.

The surface control unit and/or processor 340 may also receive signals from one or more other downhole sensors and/or devices and/or signals from the flow rate sensor $S_1$, the surface torque sensor $S_2$, and/or the surface rotational speed sensor $S_3$ and/or other sensors used in the drilling system 300 and/or may process such signals according to programmed instructions provided to the surface control unit and/or processor 340. The surface control unit and/or processor 340 may display desired drilling parameters and/or other information on a display/monitor 342 that may be utilized by an operator (not shown) to control the drilling operations. The surface control unit and/or processor 340 may typically include a computer and/or a microprocessor-based processing system, at least one memory for storing programs and/or models and/or data, a recorder for recording data, and/or other peripherals. The surface control unit and/or processor 340 may typically be adapted to activate one or more alarms 344 whenever certain unsafe and/or undesirable operating conditions may occur.

In the present disclosure, a number of different ways are used for determining the direction of the principal stresses in the subsurface. In one method, measurements made by an acoustic caliper on the BHA are used to estimate the shape of the borehole as well as the location of the BHA inside the borehole during drilling operations. The basic methodology used in the present disclosure assumes that the borehole has an irregular surface, and approximates it by a piecewise elliptical surface. This is generally shown by the surface 400. The center of the tool is at the position indicated by 455. The distance 450 from the center of the tool to the borehole wall is measured by a caliper as the tool rotates. In the example shown, the borehole wall may be approximated by two ellipses denoted by 410 and 420. The major axes of the two ellipses are denoted by 451 and 465 respectively. The points 400a, 400b are exemplary points on the borehole wall at which distance measurements are made.

For the case where the tool is in a fixed position at the center of a circular borehole, the borehole wall may be represented by the equation:

$$(x-x_0)^2+(y-y_0)^2=R^2 \quad (1),$$

where $(x_0, y_0)$ is the coordinate of the center of the acoustic caliper tool and R is the radius. The distance R may be given by $$R = r_t + \frac{v\Delta t}{2}, \quad (2)$$

Where $r_t$ is the tool radius, v is the velocity of sound in the borehole fluid, and $\Delta t$ is the two way transit time measured by an acoustic caliper. For a mechanical caliper, the second term on the right hand side of eq. (2) is simply the distance measured by the caliper. Measurements of the distance R and the angle $\theta$ define the borehole wall in polar coordinates in a tool centered coordinate system.

For an elliptical borehole, the borehole wall may be represented by an equation of the form:

$$ax^2+by^2+cxy+dx+ey+f=0 \quad (3).$$

In the real world, the center of the tool does not stay in a fixed position, the caliper measurements are subject to measurement noise and the borehole wall is irregular. The combination of all these factors makes it problematic to determine the actual offset of a formation evaluation sensor on the BHA from the wall of the borehole. The problem is addressed in the Hassan application, the contents of which are incorporated herein by reference. The method disclosed in Hassan includes estimating the geometry of the borehole by performing a least-squares fit to the measurements of the distance. Estimating the geometry of the borehole may further include rejecting an outlying measurement and/or defining an image point when the measurements of the distance have a limited aperture. The method may further include providing an image of the distance to the borehole wall. The method may further include providing a 3-D view of the borehole, identifying a washout and/or identifying a defect in the casing. The method may further include using the estimated geometry of the borehole to determine a compressional-wave velocity of a fluid in the borehole. The method may further include binning the measurements made with the formation evaluation sensor.

Figure 5:
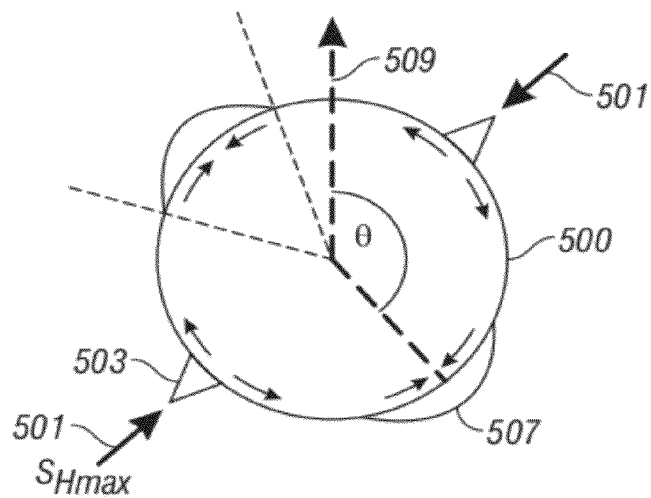
FIG. 5 shows the relationship between the maximum principal stress and induced tensile fractures in the formation.

An important point to note is that the borehole geometry obtained by this method is indicative of the principal stresses in the earth formation. For a situation in which the borehole and one principal stress are vertical, the relationships are summarized in FIG. 5. Shown therein is a cross-section of a borehole 500. North is represented by the direction 509, and the maximum principal stress in the horizontal plane is denoted by $S_{Hmax}$ 501. The effect of the stress is that the borehole shape may be deformed into an ellipse in the direction 507. The actual amount of elastic deformation due to stress is usually too small to detect using a caliper. However, breakouts may form in the direction 507 and tensile fractures may form in the direction 503 near the minor axis 501 of the ellipse. These breakouts can be detected using caliper measurements. Hence the direction of the maximum principal stress can be inferred from the azimuth of the breakouts and/or the azimuth of the tensile fractures. The determined direction may then be used to control the direction of drilling as discussed above. The magnitude of the stresses may be estimated from the strength of the rock formations. This is discussed in U.S. patent application Ser. No. 11/601,950 of Moos, having the same assignee as the present disclosure and the contents of which are incorporated herein by reference.

Figure 6A:
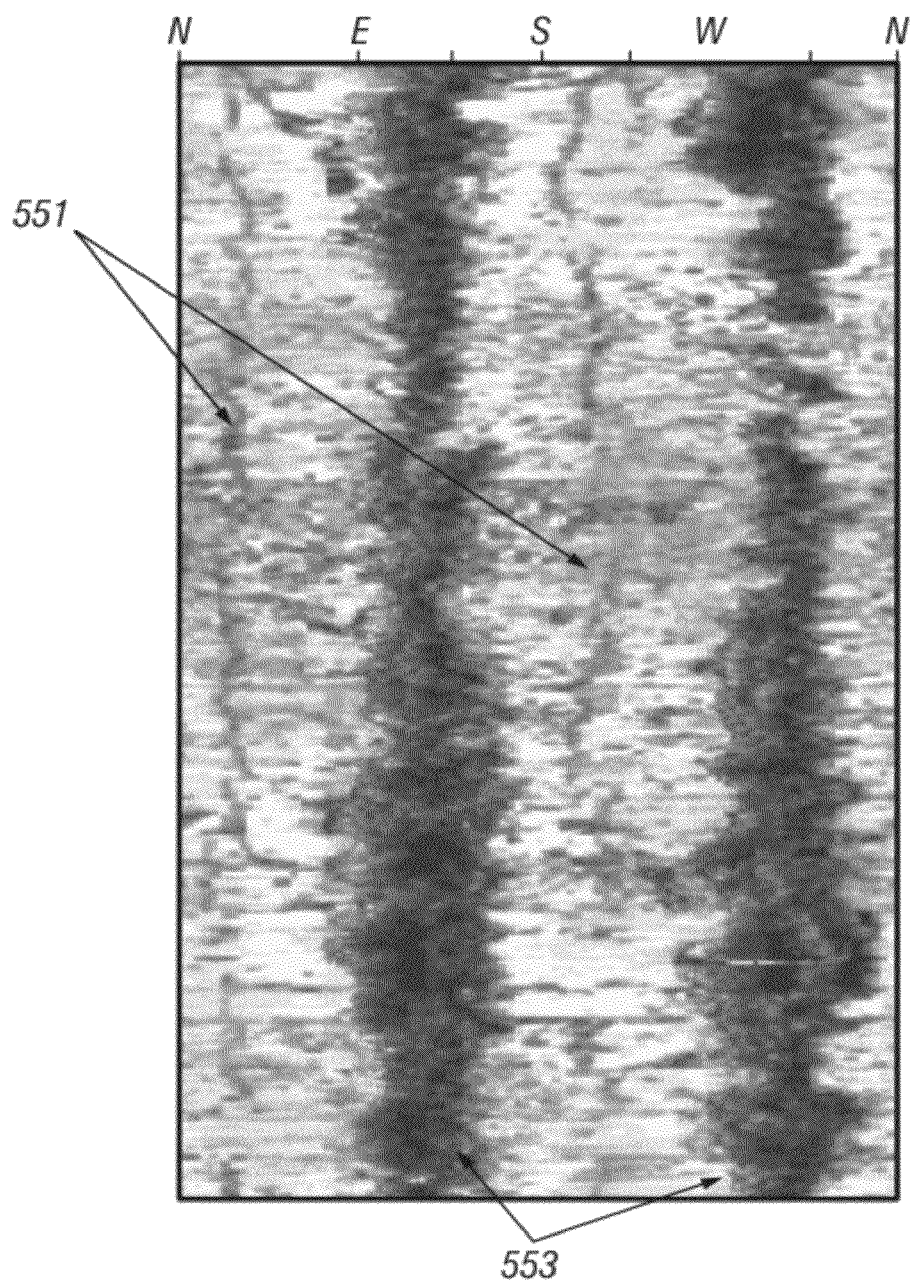
FIG. 6a shows an exemplary acoustic image of a borehole wall.

FIG. 6a shows an exemplary acoustic image of a borehole wall. The vertical axis is depth, and the horizontal axis is the circumference of the borehole wall unfolded onto a plane. In this particular example, the center of the image corresponds to South. The tensile fractures 551 can be seen in the image. The tensile fractures are oriented 90° from the breakouts 553. It is worth noting that the breakouts are characterized by a weaker signal (darker color) than the rest of the image, indicating a smaller acoustic contrast with the borehole fluid. Detailed analysis of the breakouts is discussed next.

Figure 6B:
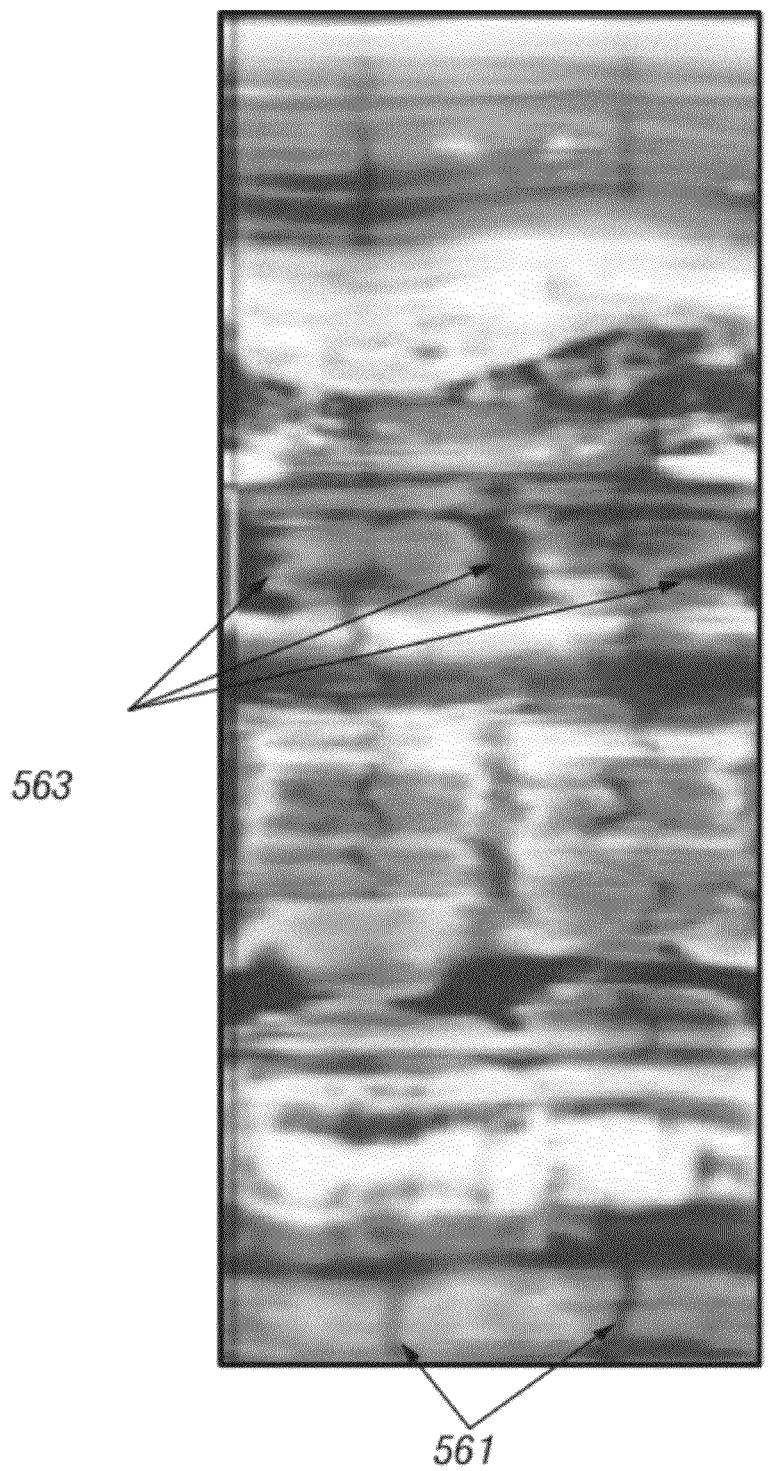
FIG. 6b shows an exemplary resistivity image of a borehole wall.

Breakouts and tensile fractures (also referred to as drilling-induced fractures) can also be seen on other images of the borehole wall. For example, FIG. 6b shows a resistivity image of a borehole wall. Such a resistivity image is obtained by using a microresistivity imaging tool. Tensile fractures are indicated by 561 while breakouts are indicated by 563. Thus, resistivity images may be used to identify the directions of the principal stress. It should be noted that other types of images, such as density images, also show breakouts and tensile fractures and can thus be used to identify the directions of principal stress.

Figure 7:
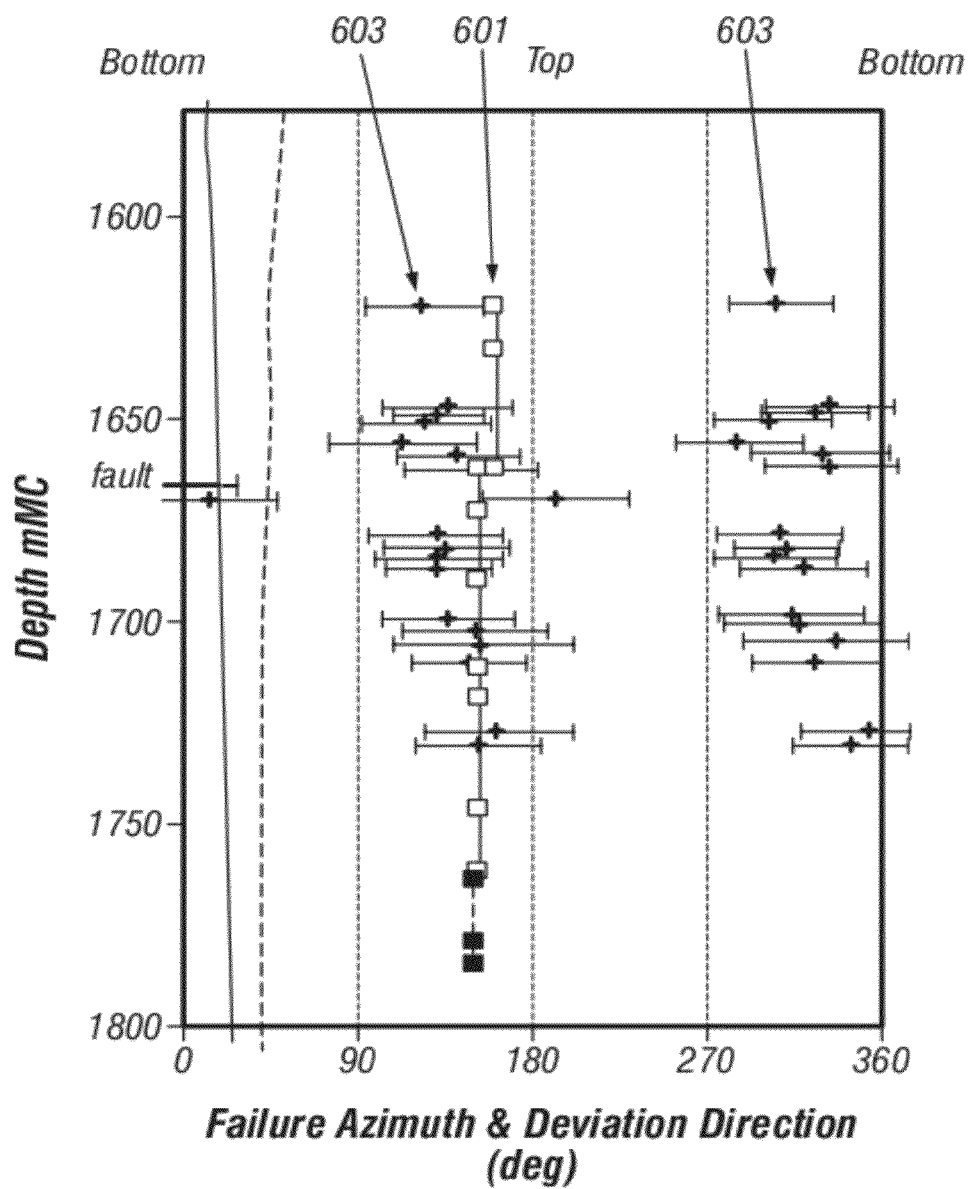
FIG. 7 shows a breakout analysis of a portion of a borehole where the toolface angle falls within the breakout region.
Figure 8:
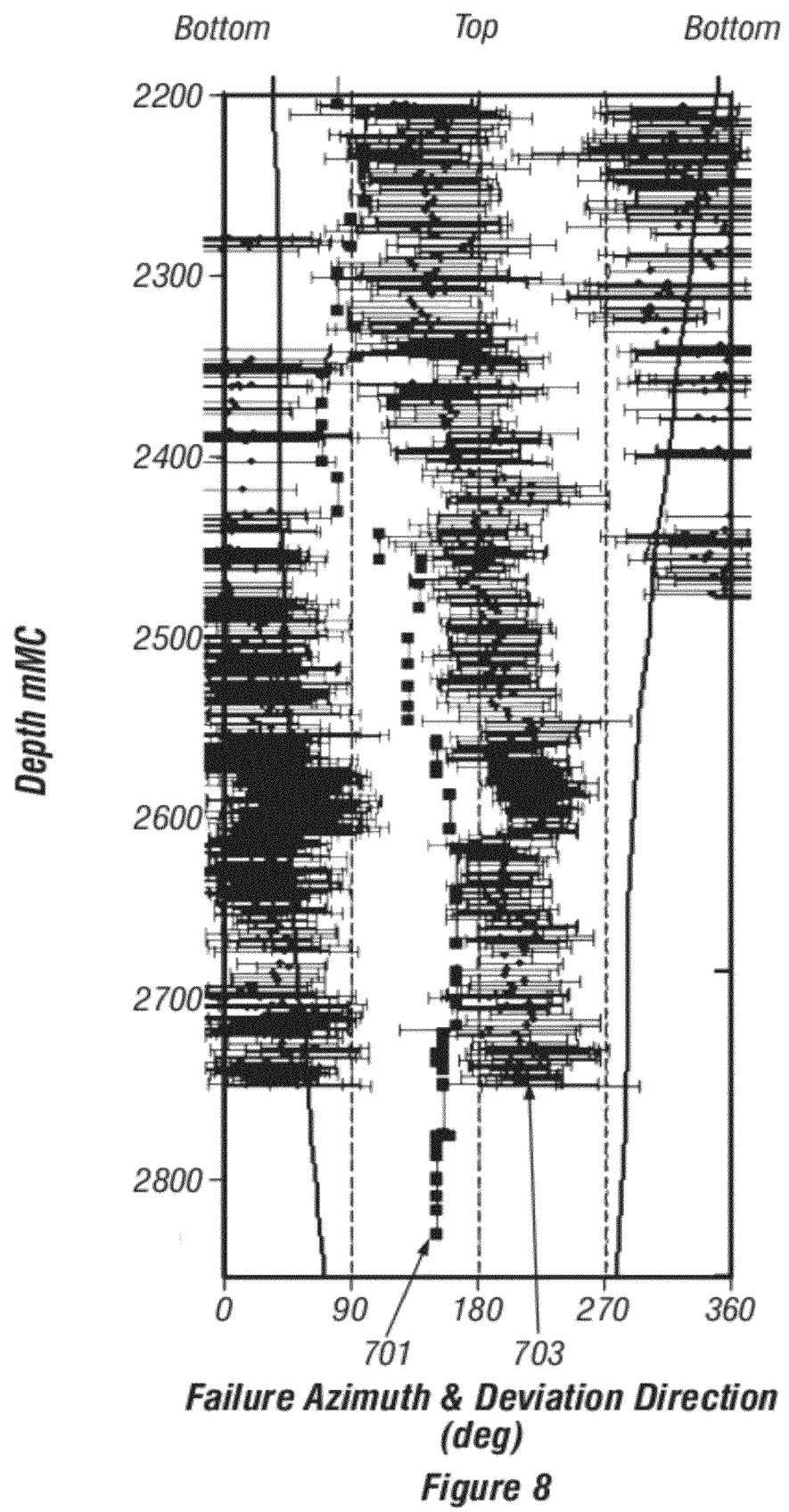
FIG. 8 shows a breakout analysis of a portion of a borehole where the toolface angle is outside the breakout.

Turning now to FIG. 7, a breakout analysis of an exemplary borehole is shown. The points connected the line 601 are the toolface angle of the BHA as a function of depth. For the purposes of this disclosure, the toolface angle is the orientation of a reference mark on the BHA. The orientation of the BHA may be determined using a magnetometer or a gyro. The horizontal bars indicated by 603 show the extent of breakouts measured in the borehole (corresponding to the width of the dark patches in FIG. 6). As can be seen, the toolface angle falls within the breakout zone for the entire displayed section. Another portion of the same borehole is shown in FIG. 8. The toolface angles are given by 701 and are clearly outside the breakout zone 703. The difference between FIGS. 7 and 8 is that the drilling over the depth interval in FIG. 7 was carried out with a BHA in which tool face preferentially tends to orient in the direction of hole enlargements, making it difficult to orient the hole in a different direction. The results are clear: in such circumstances, the borehole will tend to follow the direction of breakouts.

In contrast, the drilling for the interval shown in FIG. 8 was carried out using different BHAs and with a directional control active. With the directional control active, it is seen to be possible to overcome the natural tendency of the borehole to follow the breakouts (direction of minimum principal stress). An exemplary device for directional drilling is disclosed in U.S. Pat. No. 7,287,604 to Aronstam et al., having the same assignee as the present disclosure and the contents of which are incorporated herein by reference.

Figure 9:
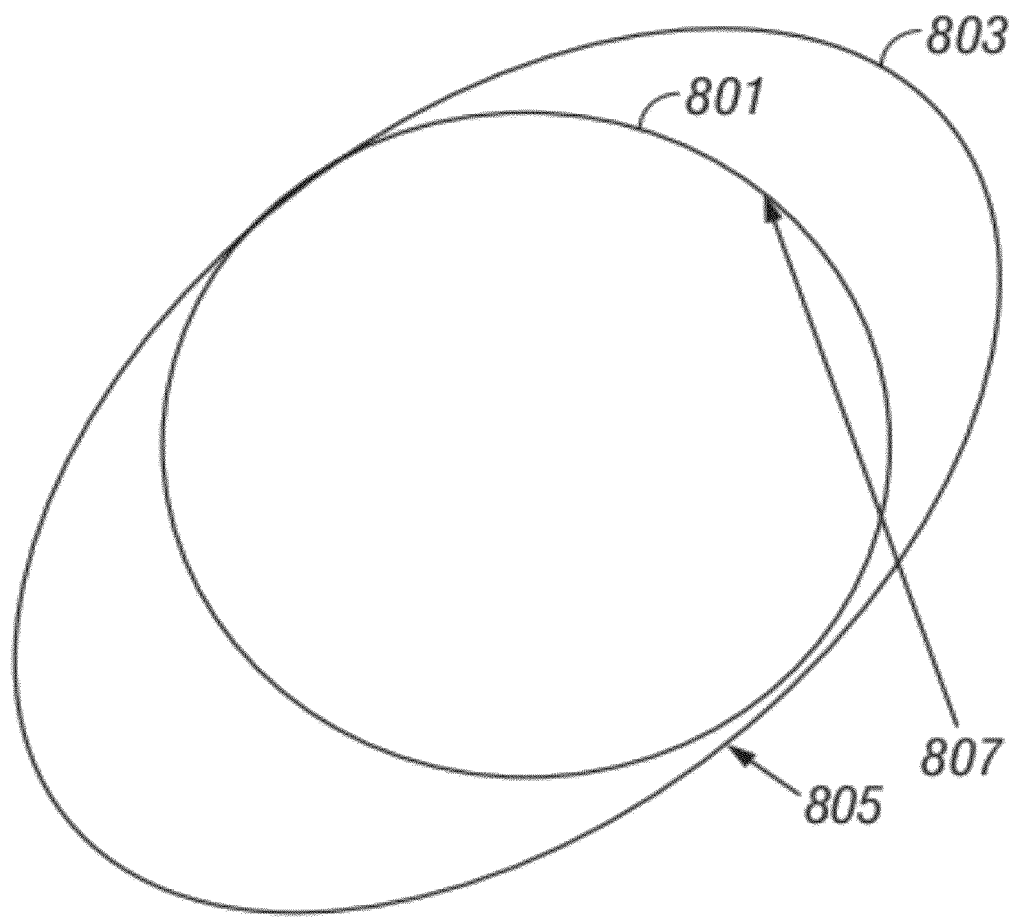
FIG. 9 shows a weakened borehole due to stress.

It should further be noted that in cases where the borehole wall has not caved in, the geometry may appear to be circular, but there would be a decrease in amplitude of the reflected caliper signal if portions of the borehole wall are starting to slough off. This is schematically illustrated by FIG. 9 where a circular borehole is represented by 801. Due to stress, there is a weakened portion denoted by the zone between 801 and the ellipse 803. The borehole when mapped using first arrival reflections appears to have the shape 801 but the reflections from the portion 807 will be weaker than those from the portion 805. See FIG. 6. In addition, if the borehole is mapped using second arrival reflections, the shape given by 803 would be obtained. The present disclosure takes amplitude changes of the reflected caliper signal into consideration for determining the principal stress directions.

In an exemplary scenario, a pilot vertical well is drilled, and then logged with an electrical image tool. Analysis of the images using methods described above may reveal drilling-induced tensile wall fractures that indicate a relatively constant maximum horizontal stress direction. Then, a lateral well may drilled from the pilot well, kicking off above the reservoir interval and reaching horizontal within the depth interval penetrated by the pilot well for which the images of tensile wall fractures indicating the maximum horizontal stress orientation were obtained. The orientation of the lateral is chosen to be identical to the $S_{Hmax}$ orientation revealed by analysis of the image logs in the vertical well, such that, when hydraulically fractured, the fractures would grow axially along the wellbore axis. The stress state is such that the fractures will be vertical (that is, the magnitude of $S_{hmin}$ is less than the magnitude of $S_v$). In other instances, the well might be drilled 90 degrees from the azimuth of $S_{Hmax}$ to ensure development of radial fractures perpendicular to the well.

Figure 10:
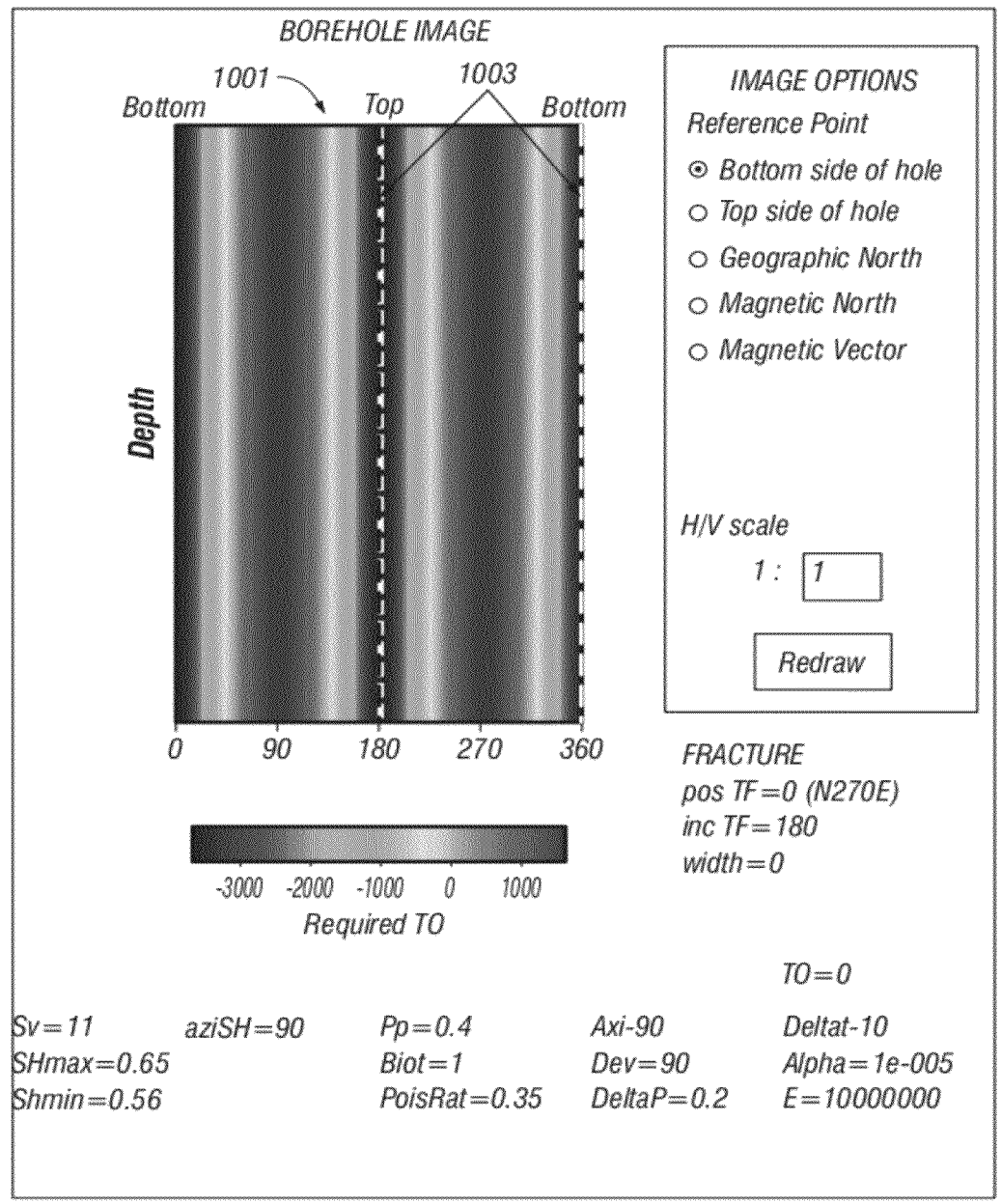
FIG. 10 shows a simulated stress and tensile failure pattern in a horizontal borehole drilled parallel to the direction of maximum horizontal stress.

During drilling of the lateral well, geosteering systems are employed to monitor the orientation of the well and its position within the reservoir. LWD image logs are also obtained to provide real-time information about wellbore wall failures that reveal the relative orientation of the well with respect to the principal stresses. The images are analyzed while drilling is under way to detect drilling-induced features that occur at specific points around the circumference of the well and also are created below the bit by excessive weight on bit and detected once the well has drilled through them. In some cases, it is possible to deliberately induce failures from which to determine the stresses by modifying drilling practice. An example is by increasing circulation rate to cool the wellbore to induce tensile failure. Another example is by raising drilling weight on bit to increase the occurrence of induced failures below the bit. Initially, the images would reveal axially oriented tensile fractures 1003 in the borehole 1001. Note that in the resistivity image of FIG. 10, the abscissa is the circumference of the borehole and the ordinate is the drilling depth. Analysis of the stress conditions necessary to create these axial fractures confirm that the well has been drilled along a principal stress direction, and thus there is no need to change the well azimuth.

Figure 11:
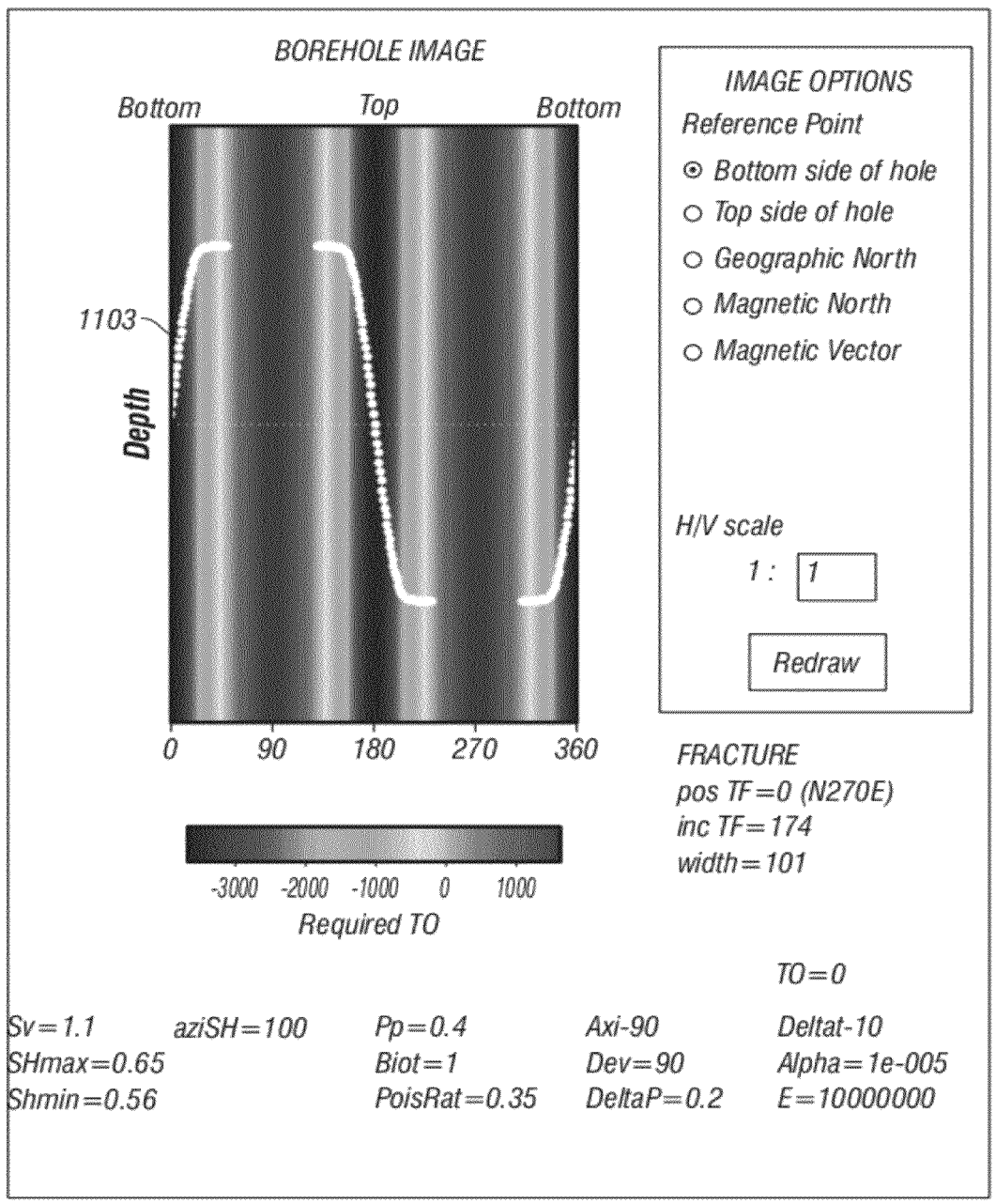
FIG. 11 shows a simulated stress and tensile failure pattern in a horizontal borehole when the azimuth of the maximum horizontal stress is 10° greater than the azimuth of the borehole.
Figure 12:
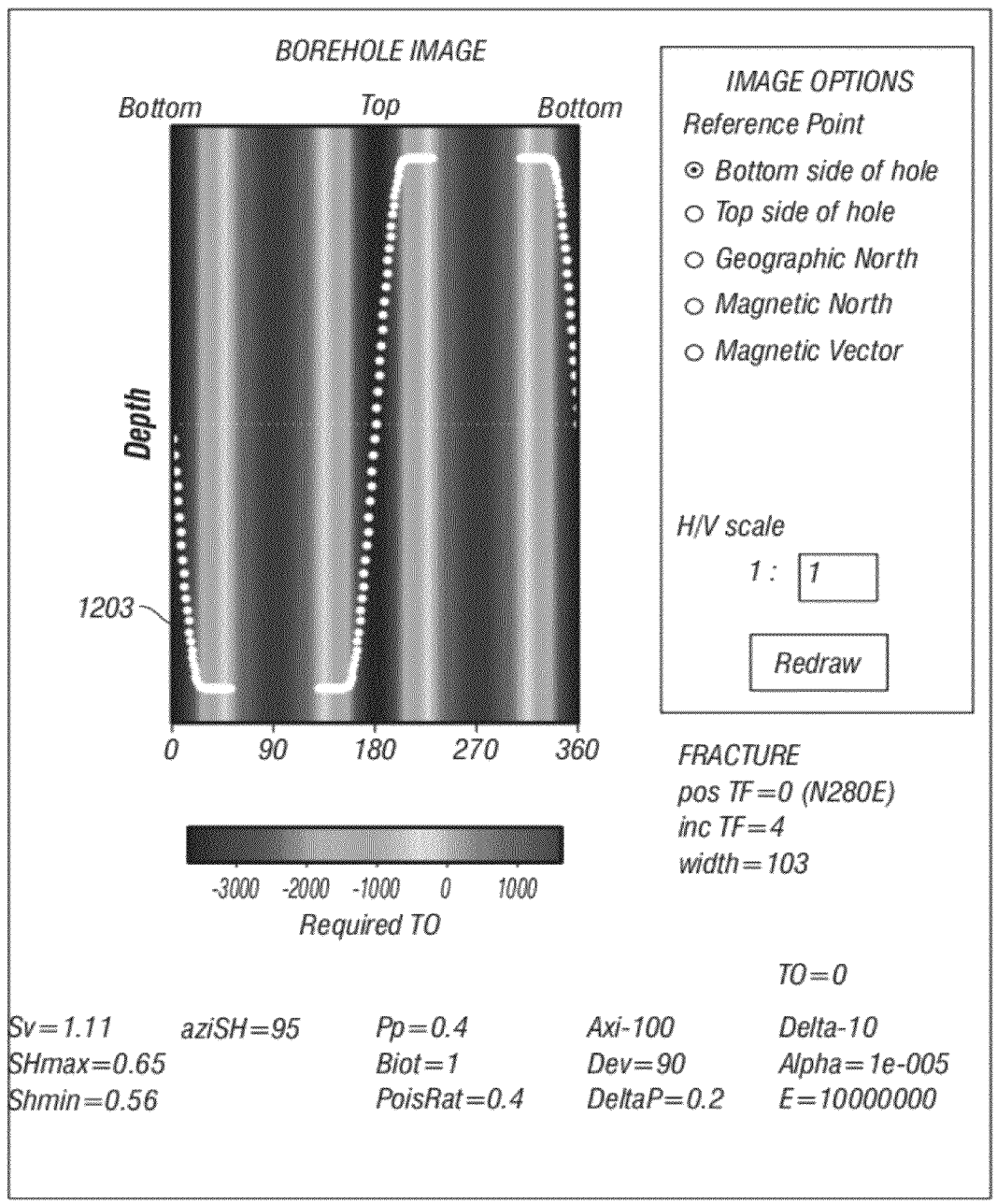
FIG. 12 shows a simulated stress and tensile failure pattern in a horizontal borehole when the azimuth of the maximum horizontal stress is 5° less than the azimuth of the borehole.

At slightly greater depth, tensile wall fractures develop with a shape indicated by 1103 in FIG. 11. For this simulation, the borehole azimuth is 90° and the azimuth of $S_{Hmax}$ is 100°. FIG. 12 shows the tensile fracture 1203 when the borehole azimuth is 100° while the azimuth of $S_{Hmax}$ is 95°. Based on these simulations, it is clear when the steering direction has to be increased and when it has to be decreased to maintain the desired trajectory.

At the end of the drilling run, images may be acquired at higher resolution than is possible with LWD imaging devices, using wireline logging tools run in the well following well-known procedures for logging horizontal wells. Stimulation intervals may be chosen where axial fractures occur in the images, because these are where the lowest pressures are required to stimulate the well and where axial fractures with good connectivity to the well are most likely to be formed. The well may then be cased, and the casing is then perforated at the chosen intervals to hydraulically fracture the formation, thus avoiding intervals where the image data reveal that the well is drilled at a finite angle to the local orientation of $S_{Hmax}$ and thus that hydraulic fractures will be more difficult to create and will have poorer connectivity to the wellbore.

A similar approach can be applied regardless of whether wells or the principal stresses are deviated or vertical; where the desired direction is parallel to or oblique to any of the in situ principal stress directions; where the features used to identify the stress field orientation with respect to the wellbore are breakouts, tensile fractures, or any other failure features; where the stress field orientation is determined using other measurements such as sonic or electrical measurements. We next discuss such alternative methods.

As would be appreciated by those of ordinary skill, a fundamental principle is that most earth materials have elastic properties that are functions of stress. In the absence of other effects, they are stiffer in the direction in which the largest compressive stress acts. Dipole sonic logging tools excite a bending mode in a well which, when the well is drilled in such a way that the stresses acting on the sides of the well are different (for example, a vertical well in a formation where the horizontal stresses are different such that $S_{Hmax}$ is greater than $S_{Hmin}$) naturally splits into two independent modes. One of these bends the well in the direction of the greatest stress, which in the case of the vertical well is the $S_{Hmax}$ stress, and one bends the well in the direction of the least stress, which in the case of the vertical well is the $S_{Hmin}$ stress. The mode that bends the well in the direction of $S_{Hmax}$ travels faster than the mode that bends the well in the direction of $S_{Hmin}$. By recording the orientations of the tool and the well, and by running a dipole log in a "Crossed-dipole" configuration, and then by analysis of the recorded waveforms using known methods, it is possible to determine the orientations of the maximum and minimum stresses using the determination of the directions in which the two modes bend the well. In cross-dipole measurements, the velocity of shear waves in the formation having two different polarizations is measured. In deviated wells or in horizontal wells the geometry is more complicated but the method can still be applied in many cases. Such a method is discussed in U.S. Pat. No. 6,098,021 to Tang et al., having the same assignee as the present disclosure and the contents of which are incorporated herein by reference.

An alternative method of using acoustic data to detect stress orientation, is using an azimuthally-recorded acoustic log. This log records the speed of propagation of acoustic waves propagating along the surface of the well bore as a function of orientation. Due to the local stress concentration, the speed of such acoustic waves is a function of orientation around the well. Because the speed of propagation in earth materials is stress-sensitive, it is possible by measuring the azimuthal dependence of acoustic velocity to determine the orientations and relative magnitudes of the in situ stresses.

Another method for determining stress directions in the subsurface uses multicomponent induction resistivity measurements. This is disclosed in U.S. Pat. No. 7,359,800 to Rabinovich et al., having the same assignee as the present disclosure and the contents of which are incorporated herein by reference. In particular, the $H_{xx}$, $H_{yy}$ and $H_{xy}$ measurements are responsive to resistivity anisotropy. Resistivity anisotropy can have several origins including laminations and bedding as well as natural and drilling induced and hydraulic fractures. It has been found that even in the absence of fracturing, these measurements indicate directions in which fractures would form if the stresses were greater. It is also worth noting that the direction of tensile fractures in the subsurface determined by the resistivity measurements is orthogonal to the breakout direction, so that directional wells drilled for the purpose of intersecting these fractures would be in the preferred direction even without directional control.

It is known to those skilled in the art that principal stresses are not always vertical and horizontal and that the stress field may be rotated by the presence of the borehole. When the effect of the borehole significantly alters the local stress field magnitude and orientation from that of the far field, the field away from the borehole, the deep reading multi-component resistivity measurements made with either wireline or logging while drilling tools can be analyzed to determine the orientation of the transverse anisotropic and biaxial anisotropic stress field. In thick homogenous isotropic media, the appearance of tensile fractures gives rise to a direction of anisotropy which can be determined from multi-component induction logging data which can be processed using for example Multi-Frequency Focusing to remove the effect of the near borehole environment to determine the orientation of the tensile fractures and, hence, infer the orientation of the far field principal stresses.

In layered media tensile fractures are often normal to the bedding and give rise to biaxial anisotropy. The principal directions of the biaxial anisotropy can be determined from the multi-component resistivity measurements and the orientation of the principal stress directions inferred. This is discussed in U.S. Pat. No. 7,317,991 to Wang et al., having the same assignee as the present disclosure and the contents of which are incorporated herein by reference.

Nuclear measurements may also be used to determine the shape of the borehole. The use of gamma ray measurements is discussed in U.S. patent application Ser. No. 11/770,209 of Madigan et al., having the same assignee as the present disclosure and the contents of which are incorporated herein by reference. As discussed in Madigan, using a heuristic model, a known value of mud density, and a known value of formation density, it is possible to determine the standoff of a gamma ray density tool as a function of azimuth. The determined offset can then be used in combination with the method of Hassan to map the borehole wall.

The analysis of the measurements made downhole may be carried out by the downhole processor and/or the surface processor. When a downhole processor is used for the analysis, it becomes possible to control the drilling direction substantially in real time, i.e., without the delay inherent in telemetering of data uphole and instructions downhole. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

What is claimed is:

1. A method of developing an earth formation, the method comprising:
   inducing a stress in the earth formation proximate a borehole to form a feature in the earth formation related to the induced stress;
   making measurements indicative of a geometry of the borehole using a bottomhole assembly (BHA) rotating in the borehole, wherein the geometry of the borehole is indicative of the feature formed in the earth formation;
   providing an image of the borehole from the measurements of the borehole geometry;
   estimating an azimuthal variation with borehole depth of the induced stress in the earth formation from the image; and
   altering a drilling parameter using the estimated azimuthal variation with depth of the induced stress in the earth formation;
   wherein making measurements indicative of the geometry of the borehole further comprises measuring a travel time for an acoustic signal from the BHA to a wall of the borehole at a plurality of azimuthal orientations of the BHA, and wherein estimating the azimuthal variation with borehole depth of the induced stress further comprises using the travel time at the plurality of azimuthal orientations of the BHA to estimate the geometry of the borehole and a position of the BHA inside the borehole.

2. The method of claim 1 wherein altering the drilling parameter further comprises controlling a direction of drilling using the estimated azimuthal variation with borehole depth of the induced stress.

3. The method of claim 1 further comprising:
   making a measurement of an amplitude of a reflection of the acoustic signal from the wall of the borehole, and
   using the measured amplitude of the reflection to identify a breakout.

4. The method of claim 1 wherein making measurements indicative of the geometry of the borehole further comprises measuring a first velocity of a shear wave having a first polarization in the earth formation and measuring a second velocity of a shear wave having a second polarization in the earth formation.

5. The method of claim 1 wherein making measurements indicative of the geometry of the borehole further comprises making measurements with a multicomponent resistivity instrument in the borehole at the plurality of azimuthal orientations of a bottomhole assembly (BHA).

6. The method of claim 1 wherein making measurements indicative of the geometry of the borehole further comprises making measurements with at least one of: (i) a resistivity imaging tool, and (ii) a gamma-ray density tool.

7. The method of claim 1 wherein estimating the azimuthal variation with borehole depth of the induced stress in the formation further comprises identifying a direction of at least one of: (i) a maximum principal stress, and (ii) a minimum principal stress.

8. The method of claim 1 wherein altering the drilling parameter further comprises using at least one of: (i) a direction of the borehole, and (ii) a direction of a tensile fracture in the borehole.

9. A system configured to develop an earth formation, the system comprising:
   a drill string configured to induce a stress in the earth formation proximate a borehole to form a feature in the earth formation related to the induced stress;
   a bottomhole assembly (BHA) on the drill string;

a sensor assembly on the BHA configured to make measurements indicative of a geometry of the borehole in the earth formation during rotation of the BHA, wherein the geometry of the borehole is indicative of the feature formed in the earth formation due to the induced stress in the earth formation;

at least one processor configured to provide an image of the borehole from the measurements of the borehole geometry and estimate an azimuthal variation with borehole depth of the induced stress in the formation from the image; and a device configured to alter a drilling parameter of the BHA using the estimated azimuthal variation with borehole depth of the induced stress in the earth formation, wherein the sensor assembly further comprises an acoustic assembly configured to measure a travel time of an acoustic signal from the BHA to a wall of the borehole at a plurality of azimuthal orientations of the BHA, and wherein the at least one processor is configured to estimate the azimuthal variation with borehole depth of the induced stress by using the travel time at the plurality of azimuthal orientations of the BHA to estimate the geometry of the borehole and a position of the BHA inside the borehole.

10. The system of claim 9 wherein the drilling parameter further comprises a direction of drilling.

11. The system of claim 9 wherein the acoustic assembly is further configured to make a measurement of an amplitude of a reflection of the acoustic signal from the wall of the borehole, and wherein the at least one processor is further configured to use the amplitude of the reflection to identify a breakout.

12. The system of claim 9 wherein the sensor assembly further comprises an acoustic source configured to generate a first acoustic wave having a first polarization in the formation and a second acoustic wave having a second polarization in the formation, and wherein the at least one processor is further configured to use a velocity of the first acoustic wave and a velocity of the second acoustic wave to estimate the azimuthal variation with depth of the stress.

13. The system of claim 9 wherein the sensor assembly further comprises a multicomponent resistivity instrument in the borehole configured to measure a formation resistivity property at a plurality of azimuthal orientations of the BHA.

14. The system of claim 9 wherein the sensor assembly further comprises at least one of: (i) a resistivity imaging tool configured to make measurements indicative of a resistivity of the formation, and (ii) a gamma ray density tool.

15. The system of claim 9 wherein the device is further configured to alter the drilling parameter by using at least one of: (i) direction of the borehole, and (ii) a direction of a tensile fracture in the borehole.

16. The system of claim 9 wherein the at least one processor is configured to estimate the azimuthal variation with depth of the stress in the earth formation by further identifying a direction of at least one of: (i) a maximum principal stress, and (ii) a minimum principal stress.

17. A non-transitory computer-readable medium product having stored thereon instructions that when read by at least one processor cause the at least one processor to execute a method, the method comprising:

receiving measurements indicative of a geometry of a borehole in a formation indicative of a stress induced in the formation to form a feature in the formation, the measurements obtained at a sensor on a bottomhole assembly (BHA) during rotation of the BHA;

forming an image of the borehole from the received measurements of the borehole geometry;

estimating an azimuthal variation with borehole depth of the induced a stress in the formation from the image; and altering a drilling parameter of the BHA using the estimated azimuthal variation with borehole depth of the induced stress in the formation;

wherein receiving measurements indicative of the geometry of the borehole further comprises measuring a travel time for an acoustic signal from the BHA to a wall of the borehole at a plurality of azimuthal orientations of the BHA, and wherein estimating the azimuthal variation with borehole depth of the induced stress further comprises using the travel time at the plurality of azimuthal orientations of the BHA to estimate the geometry of the borehole and a position of the BHA inside the borehole.

18. The computer-readable medium of claim 17 further comprising at least one of (i) a ROM, (ii) and EPROM, (iii) an EEPROM, (iv) a flash memory, and (v) an optical disk.

19. The computer-readable medium of claim 17 wherein the instructions further enable the processor to control a direction of drilling of the BHA.

* * * * *